(No Model.)
E. L. BAKER.
THILL COUPLING.
No. 303,413. Patented Aug. 12, 1884.
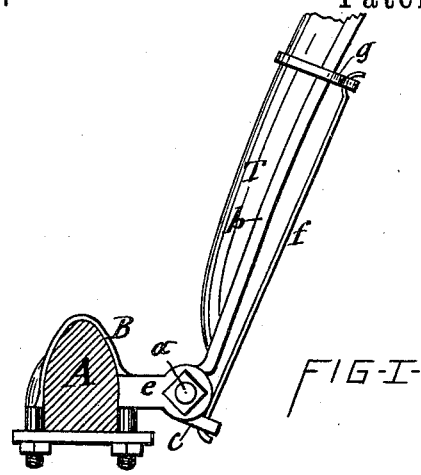
FIG-I-
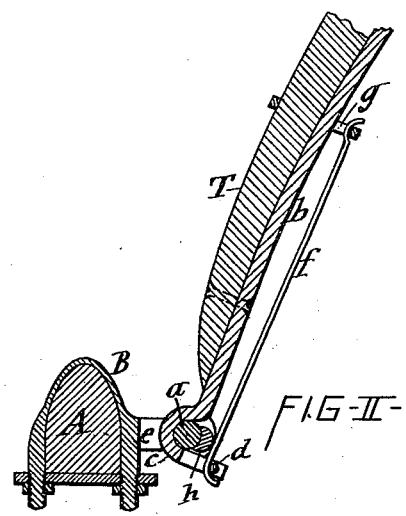
FIG-II-
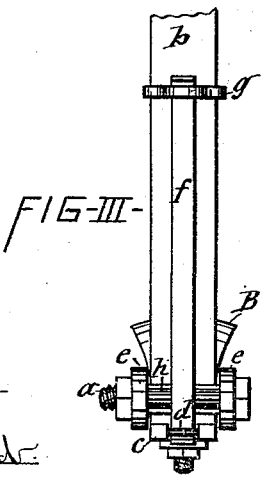
FIG-III-
WITNESSES
INVENTOR
Ellis L. Baker

UNITED STATES PATENT OFFICE.

ELLIS L. BAKER, OF SYRACUSE, NEW YORK.

THILL-COUPLING.

SPECIFICATION forming part of Letters Patent No. 303,413, dated August 12, 1884.

Application filed May 16, 1884. (No model.)

*To all whom it may concern:*

Be it known that I, ELLIS L. BAKER, of Syracuse, in the county of Onondaga, in the State of New York, have invented new and useful Improvements in Thill-Couplings, of which the following, taken in connection with the accompanying drawings, is a full, clear, and exact description.

This invention relates to a thill-coupling which is simple and comparatively inexpensive in construction, easily repaired when required, and facilitates the attachment and detachment of the thills to and from the vehicle, and when attached is perfectly secure, and effectually prevents rattling of the same.

The invention consists in the combination, with the coupling-bolt and thill, of a thill-iron terminating with a hook adapted to engage the coupling-bolt, a lever connected with the hook of the thill-iron back of the coupling-bolt and extended under the thill, a wear-block removably interposed between the lever and coupling-bolt, and a catch movably connected with the thill and adapted to retain the free end of the lever, all as hereinafter more fully described, and specifically set forth in the claim.

The invention is fully illustrated in the annexed drawings, wherein Figure 1 is a side view of my improved thill-coupling. Fig. 2 is a longitudinal section thereof, and Fig. 3 is a front view of the same.

Similar letters of reference indicate corresponding parts.

A represents the forward axle of a vehicle, and B the usual clip applied to the axle, and provided with ears $d$, which are perforated for the reception of the bolt $a$, by which the thill T is connected to the vehicle.

The connection of the thill with the bolt $a$, I effect by the following instrumentalities: The thill-iron $b$, I terminate with a hook, $c$, adapted to engage the bolt $a$. The free end of said hook is slotted or bifurcated, and has rigidly secured across it a pin, $d$.

$f$ denotes an elastic lever in the form of a steel plate, which is arranged under the thill and coupling-bolt $a$, and has its rear end passing through the slot of the hook $c$ back of the coupling-bolt, and provided with a suitable hold on the pin $d$, so as to be retained thereon.

$g$ is a catch movably connected with the thill and adapted to engage and retain the long arm or forward end of the lever $f$.

$h$ is a block interposed between the aforesaid lever and bolt $a$, and constituting the fulcrum for the lever, and a bearing for the same on the bolt, said bearing being on the side of the bolt opposite that which is engaged by the hook of the thill-iron, and thus serves to maintain the latter in its connection with the bolt.

The lever $f$ is designed to possess sufficient stiffness to exert the requisite pressure on the block $h$ to prevent rattling of the parts. Said block is removable, so as to admit of renewing the same when required.

The thill is readily detached from the vehicle, when desired, by merely throwing the catch $g$ off the forward end of the lever and either dropping the latter or entirely removing it from the thill-iron, then by dropping the forward end of the thills and raising the rear end thereof the hook $c$ of the thill-iron is drawn out from behind the coupling-bolt, and the thills are thus detached. The attachment of the thill is effected with equal facility.

It will furthermore be observed that in my improved thill-coupling the anti-rattling bearing or block $h$ is readily replaced when worn out.

I do not claim, broadly, the arrangement of a thill-iron hooked over the coupling-bolt and a spring-lever fulcrumed on the thill-iron and pressing on the coupling-bolt, as I am aware the same is not new; but What I do claim as my invention is—

In combination with the coupling-bolt and thill, a thill-iron terminating with a hook engaging the coupling-bolt, a lever connected with said hook back of the coupling-bolt, a wear-block interposed between the lever and coupling-bolt, and a catch movably connected with the thill and adapted to retain the free end of the lever, substantially as described and shown.

In testimony whereof I have hereunto signed my name and affixed my seal, in the presence of two attesting witnesses, at Syracuse, in the county of Onondaga, in the State of New York, this 1st day of May, 1884.

ELLIS L. BAKER. [L. S.]

Witnesses:
 FREDERICK H. GIBBS,
 C. BENDIXON.